United States Patent [19]

Shen

[11] 4,421,865

[45] Dec. 20, 1983

[54] SELECTIVE HYDROGEN-DEUTERIUM INTERCHANGE USING ION EXCHANGE RESINS

[75] Inventor: Jacob Shen, c/o Aramco Service Company, P.O. Box 8745, Dhahran, Saudi Arabia

[73] Assignee: Standard Oil Company (Sohio), Cleveland, Ohio

[21] Appl. No.: 271,467

[22] Filed: Jun. 8, 1981

[51] Int. Cl.$^{3}$ .............................................. B01J 39/20

[52] U.S. Cl. ...................................... 521/31; 568/902; 568/852; 562/598; 521/38

[58] Field of Search ........................ 521/31, 28, 25, 38

[56] References Cited

U.S. PATENT DOCUMENTS

| | | | |
|---|---|---|---|
| 3,681,021 | 8/1972 | Mikovsky et al. | 23/204 C |
| 3,900,557 | 8/1975 | Sthrathdee | 252/431 P |
| 4,085,061 | 4/1978 | O'Brien | 210/682 |

*Primary Examiner*—Joseph L. Schofer
*Assistant Examiner*—Peter F. Kulkosky
*Attorney, Agent, or Firm*—Debra L. Pawl; Herbert D. Knudsen; Larry W. Evans

[57] ABSTRACT

A method of obtaining deuterated compounds from compounds having an abstractable proton comprises contacting the proton-containing compound with a porous ion exchange resin which contains at least some deuterons. The reverse process of substituting protons for deuterons in deuterated compounds is also described. Highly pure products can be obtained.

10 Claims, No Drawings

SELECTIVE HYDROGEN-DEUTERIUM INTERCHANGE USING ION EXCHANGE RESINS

BACKGROUND OF THE INVENTION

1. Field of the Invention

This invention relates to a process for interchanging hydrogen and deuterium atoms in selected compounds using ion exchange resins. A compound containing a labile proton can be deuterated by the process of this invention, or alternatively a deuteron in a compound can be replaced by a proton.

2. Description of the Prior Art

Ion exchange, the reversible interchange of ions between a solid and a liquid phase without the permanent change in the structure of the solid, has found a wide variety of applications. For example, an ion exchanger is used in water softeners to exchange sodium for calcium, thus removing calcium from hard water and replacing it with an equivalent quantity of sodium. Ion exchange is also used for deionization of water, purification of chemicals, concentration of metal solutions, and separation of ionized materials to obtain non-ionized or slightly-ionized materials.

The ability to manufacture synthetic resins having either a particular characteristic or great versatility has resulted in their use in many industrial processes. One use for such synthetic ion exchange resins has been as packing material in gas chromatographic units. Gas chromatography is primarily a separation technique with widely known applications in analytical chemistry, and until recently it had been thought impractical to prepare compounds on a large scale using this technique. Previous use of gas chromatographic systems to prepare or extract compounds has been very limited.

Other methods are known for exchanging hydrogen for deuterium or increasing concentrations of deuterium from that found in natural sources. U.S. Pat. No. 3,900,557 to Strathdee describes a catalyst comprising a transition metal coordination complex anchored on a cross-linked polystyrene. The anchored catalyst is useful for promoting H-D exchange between deuterated forms of hydrogen-containing gas streams and liquid water or alcohols.

U.S. Pat. No. 3,681,021 to Mikovsky et al. relates to the production of heavy water by subjecting a mixture of $H_2$ and $H_2O$ to isotopic exchange with each other in the presence of a catalyst comprising a Group VIII metal on a resin support. The system is described as useful for the transfer of deuterium from hydrogen gas to water, followed by the recovery of deuterium from the thus-enriched heavy water.

U.S. Pat. No. 3,510,519 to Frejaville et al. relates to the preparation of deuterated compounds by contacting and reacting under non-turbulent countercurrent flow conditions two compounds wherein one of the compounds is in liquid form and the other is in gaseous form. Frejaville et al. rely on a greatly elongated uncatalyzed reaction zone to achieve H-D exchange.

Other known methods of producing deuterated compounds typically involve laborious separation procedures to isolate the desired product from others in a product mixture. Conventional substitutions and separation techniques are especially difficult when using compounds such as deuterium and hydrogen because they have very similar physical properties.

SUMMARY OF THE INVENTION

The invention concerns a process for exchanging at least one labile proton of a first compound with at least one labile deuteron of a second compound by contacting the first compound with the second compound. In the process, one of the compounds is a porous ion exchange resin and the other compound is a non-solid (either of a gas or liquid).

DETAILED DESCRIPTION OF THE INVENTION

According to this invention, a compound containing a labile proton can be deuterated by contacting the compound with a porous polymer support which contains at least some deuterons. Alternatively, a compound containing a labile deuteron can be protonated by contacting such compound with a porous polymer support which contains at least some protons. The present method is a simple, rapid and inexpensive way to produce highly pure compounds in good yields.

A proton is the nucleus of a hydrogen atom, and is present in readily ionizable compounds as a positively-charged species. A deuteron is the corresponding isotope, consisting of both a proton and a neutron. For the purposes of this invention, a proton or deuteron in a compound is considered to be labile if at least some of the protons or deuterons in the compound are capable of being abstracted when contacted with a porous polymer support as described below. Examples of compounds with labile protons include those with hydroxy groups and those in which a hydrogen is linked to sulfur or nitrogen.

PROCESS APPARATUS

The process can be carried out in any manner which is capable of bringing the compound to be deuterated or protonated into contact with the porous ion exchange resin. Accordingly, placing the ion exchange resin into a vessel and then introducing the compound to be deuterated or protonated into the vessel in the form of a liquid or gas is within the scope of the invention. Further, adding the resin in one or more batches to a vessel containing the compound is also contemplated. Preferably, the invention is practiced by utilizing a gas chromatographic (GC) unit containing the ion exchange resin and injecting the compound to be deuterated or protonated.

The process is conveniently carried out on any GC unit which employs the porous supports described below. The size of the unit is not critical, and can vary from those commonly used in laboratories to commercial-scale units. The size chosen will depend in part upon the quantity of product desired, although as discussed below there may be a practical limit to the size a particular GC unit.

One of the obstacles encountered in attempting to scale-up gas chromatograhic operations having packed polymer beads as the ion exchange resin has been the difficulty in packing a column having a diameter larger than about 40 mm to avoid short-circuit passages and voids, which result in low overall efficiency. Some of these obstacles have been overcome, and commercially favorable results have been reported from a production-scale gas chromatography unit recently developed by the Societe National Elf Aquitaine and the Societe de Recherches Techniques et Industrielles (SRTI) of Paris. Rules and suggestions for such large-scale columns are contained in Roz et al., "Practical Operation of Prep-Scale Gas Chromatographic Units", *Journal of Chromatograhic Science,* Vol.14, pp.367–80 (August 1976), the disclosure of which is incorporated herein by reference.

The size of the column is not critical, but there must be a compromise between the desire for a column having a minimum length and large diameter to increase throughput and the need for a smaller diameter and longer length to provide sufficient reactant contact time. As demonstrated in the Examples, a glass column having a ratio of inside diameter to total length of about 1:500 produced satisfactory results. Glass is preferred for column systems operated at higher temperatures in order to avoid absorption or reaction of polar compounds with hot metal surfaces.

SUPPORT MATERIAL

Porous polymeric substrates have provided support for catalysts containing the transition metals, the resulting catalyst system being used for H-D exchange as shown in Strathdee and Mikovsky et al., supra. In the instant invention, a porous polystyrene crosslinked with divinylbenzene has been found to be effective for H-D exchange without the need for a catalyst.

The porous polymer supports used in this invention can be any porous polymer support such as styrene-divinylbenzene, cross-linked polystyrenes, acrylonitrile-divinylbenzene copolymers, and other polyaromatic polymers. Preferred supports are polymerized beads of styrene-divinylbenzene, which can be obtained commercially. Examples of such supports are the Chromosorb® polymer materials available from the Johns-Manville Corporation. These supports have surface areas of from about 15 to 800 square meters per gram, while highly-preferred supports for general use are styrene-divinylbenzene supports having a surface area of about 300–400 square meters per gram.

Supports with high surface areas are typically used if more contact time is needed between the compound and the support, but other factors may also have to be considered. For example, if the compound to be deuterated is polar, generally the support need not have a high surface area.

Other suitable supports include Tenax® (2,6-diphenyl-p-phenylene oxide) (developed by AKZO Research and marketed by Enka of The Netherlands) and Poropaks®, (a porous polymer manufactured by Waters Associated of Milford, Mass.) Information on other supports and their preferred uses is readily available in trade literature and journals, and the choice of a suitable support may be established by simple substitution.

PROCESS CONDITIONS

The process can be conducted at any conditions which are not deleterious to the composition or the function of the ion exchange resin which is chosen. Such limits can readily be determined by referring to information provided by the manufacturer of the resin, or by conducting tolerance tests to determine the limits of temperature or pressure in the absence of such information.

The vessel or reaction chamber can be open to the atmosphere or it can be substantially closed. Typical GC units use a closed vessel or column with an inert carrier gas to carry the injected compound through the column. Helium, nitrogen, hydrogen or another inert gas which does not have a detrimental effect on the operation of the process or on the subject compounds can be used. The use of a carrier gas is not critical to the invention, but is used for convenience in a preferred embodiment of the invention. For example, helium or hydrogen can be used with most commercially-available laboratory scale GC units. However, other means of contacting the reactants and the support, such as a gravity-fed flow of liquid through a large-diameter column, are within the scope of this invention.

Likewise, the pressure in an open reaction system is important only as it affects the rate of flow of the compounds through the system. Generally, an increase in the pressure of the carrier gas will increase the rate of flow of the reactants through the system.

Higher temperatures will generally increase the system kinetics and decrease the amount of time needed for the process. As is well known in the operation of GC equipment, a lower column temperature typically results in a longer retention time for the compounds injected into the column. The reaction can take place over a wide temperature range, from below room temperature (below 20°–25° C.) to the upper temperature limit (typically 250° C. to 350° C.) of the particular porous polymer used. The low temperature limit is determined by the temperature of the solid-liquid phase change of a particular compound.

In a preferred embodiment, the temperature of the GC unit inlet slightly above that required to vaporize the compound injected, such as 10° C. above the compound's boiling point. The process is preferably conducted in the vapor phase, although liquids may be used if a carrier gas or other means are available to transport the compound through the column.

In the operation, a column is packed with the ion exchange resin, preferably in the form of beads. The column is charged with the material containing the protons or deuterons, as desired. For example, if it is desired to deuterate an undeuterated or relatively undeuterated compound, the porous polymer support would be charged by passing a relatively deuterated compound, typically deuterium oxide (heavy water), over the resin. Heavy water is a preferred deuterating compound, and will be used in further descriptions of the deuterating material. Deuterium absorption by the support is demonstrated by the injection of a small amount of $D_2O$ into a lab scale GC unit and the recovery of only $H_2O$ from the other end. If additional $D_2O$ is injected, the end samples begin to show increasing amounts of $D_2O$ with the water, and the column is fully charged when the sample returned is almost entirely composed of $D_2O$. About 10–50 microliters was sufficient to charge a $\frac{1}{8}'' \times 5'$ column containing Chromosorb® 102.

Alternatively, if it is desired to protonate a deuterated or relatively deuterated compound, the support would be charged by passing a relatively less deuterated compound (such as water) over the resin.

REACTANT COMPOUNDS

The compound to be deuterated must contain a proton capable of being abstracted, for example a hydrogen which is linked to an oxygen, sulfur, nitrogen or in the alpha position of a C═O bond. This abstractable hydrogen entity can also be referred to as a labile proton. Generally, the most labile proton is the first to be exchanged for a deuteron. If other protons are labile, they may also be exchanged for a deuteron. For example, deuteration of acetic acid caused deuteration of the hydroxy proton in addition to a small percentage of the other hydrogen atoms.

Any compound containing a labile proton can be deuterated. A few examples of these are organic acids such as acrylic acid or acetic acid, glycols including ethylene and propylene glycol, and compounds containing primary or secondary amides. Preferred reactants are alcohols, containing a hydroxyl hydrogen. Reaction occurs by allowing these compounds to pass through the deuterated supports. Yields are excellent, generally over 99% deuterated product on the first pass. Of course, as the deuterium is transferred to the compounds, the per pass yield will decrease. The column can then be recharged with a source of deuterium, e.g. heavy water.

The method described for the protonation of deuterated compounds is especially useful for preparing partially deuterated compounds which are otherwise difficult to obtain. For example, $CD_3OH$ can be easily obtained by injecting $CD_3OD$ from a column which is initially substantially free of deuterium. Similarly, $CD_3CD_2OH$ can be simply prepared by injecting $CD_3CD_2OD$ into an undeuterated column.

SPECIFIC EMBODIMENTS

For small quantities of reactants, laboratory-scale units are preferred for ready availability and ease of operation due to widely-available literature on effective operating techniques. The following examples were obtained by using a Varian Model 3700 gas chromatographic unit.

EXAMPLE 1

A glass column five feet in length with an inside diameter of one-eighth inch was prepared by packing the column with 1.9 grams of porous polymer support material. The support was Chromosorb® 102 as obtained from the Johns-Manville Corporation, a styrene-divinylbenzene cross-linked resin described as having the following physical characteristics: free-fall density, 0.29 g/cc; surface area, 300–400 square meters/gram; average pore diameter, 0.0085 microns. A mass spectrometer was connected to the GC via a glass-lined stainless steel interface line and was used to monitor and identify column effluents.

The column temperature was kept at 200° C. isothermally while a helium flow of 40 ml/min was passing through the column as a carrier gas. About one microliter of $D_2O$ was injected into the injection port with a syringe, and the effluents that eluted from the end of the column were analyzed by the mass spectrometer. The mass spectral data obtained showed that $H_2O$, instead of $D_2O$, was eluting from the column, indicating that H/D exchange was taking place as $D_2O$ was passing through the column.

As more $D_2O$ was injected into the column, the amount of $H_2O$ in column effluents started to decrease and the amount of $D_2O$ in column effluents began to increase. After injection of about 100 microliters of $D_2O$, the column was fully deuterized as evidenced by the absence of $H_2O$ in column effluents. At this point, one microliter of $D_2O$ was injected into the column, and $D_2O$ eluted from the column at a purity of 99+%.

About 1 microliter of methanol was then injected into the fully deuterized column, and pure (over 99%) $CH_3OD$ eluted from the column.

EXAMPLES 2–5

Example 1 was repeated under the same conditions using other alkanols as the feed: ethanol, isopropanol, isobutanol, and t-butanol. The corresponding deuterated alcohol eluted from the column at over 99% purity.

EXAMPLES 6–17

Additional experiments were conducted using a 6′ by ⅛″ stainless steel column packed with Chromosorb® 101 as obtained from the Johns-Manville Corporation, also a styrene-divinylbenzene cross-linked resin described as having the following physical characteristics: free-fall density, 0.30 g/cc; a surface area of less than 50 square meters/gram; average pore diameter, 0.3–0.4 microns. A mass spectrometer was connected to the GC via a glass-lined porous support. A helium carrier gas was used with a flow-rate of 25 ml/min. The temperature was 200° C. with the injector port temperature kept at 220° C. The column was initially charged with deuterium by injecting about 100 microliters of $D_2O$ in 10 microliter portions. In all of the following experiments, one microliter of the compound was slowly injected into the GC inlet port.

The degree of deuteration was determined by observing the increase in mass of the molecular ion in the mass spectrum. Results for the indicated compounds are given in Table I below. The small letter "d" with subscript indicates the number of deuterium atoms in the compound.

TABLE I

Deuteration using Chromosorb(R) 101

| Compound | Deuterated Product | Comments |
|---|---|---|
| $CH_3OH$ | $CH_3OD$ | — |
| $CH_3COOH$ | $CH_3COOD$ | Small amount $d_2$ formed |
| $CH_2CHCOOH$ | $CH_2CHCOOD$ | — |
| $CH_2OHCH_2OH$ | $CH_2ODCH_2OD$ | both hydroxyl protons |
| $CH_3CHOHCH_2OH$ | $CH_3CHODCH_2OD$ | both hydroxyl protons |
| $CH_3COCH_3$ | $CH_3COCH_2D$ | estimated 20% $d_1$ |
| $HCONH_2$ | $HCOND_2$ | (N—H protons) |
| $HCON(CH_3)_2$ | None | — |
| $N(CH)_4CH$ | None | — |

EXAMPLES 18–19

Deuteration of methanol and acetic acid was accomplished at the conditions of Examples 6–17, except that a 10′×⅛″ column packed with Chromosorb® 107 (a crosslinked acrylic ester) was used. Results are shown in Table 2.

TABLE II

Deuteration using Chromosorb(R) 107

| Compound | Formula | Product |
|---|---|---|
| Methanol | $CH_3OH$ | $CH_3OD$ |
| Acetic acid | $CH_3COOH$ | $CH_3COOD$* |

*also small amounts of $CH_2DCOOD$, $CHD_2COOD$ and $CD_3COOD$

For Example 19 (acetic acid), the number of protons exchanged varied with time. The exchange of the acidic proton probably occurred immediately, followed by the methyl protons.

EXAMPLES 20–22

The protonation of deuterated compounds was conducted using a 5′×⅛″ glass column packed with Chromosorb® 101 as the support. The column was charged by injecting about 100 microliters of $H_2O$. One microliter of the compounds listed in Table III were injected into the column.

TABLE III

| Protonation using Chromosorb(R) 101 | | |
|---|---|---|
| Compound | Formula | Product |
| $d_4$-methanol | $CD_3OD$ | $CD_3OH$ |
| $d_4$-acetic acid | $CD_3COOD$ | $CD_3COOH$ |
| $d_6$-acetone | $CD_3COCD_3$ | $CD_3COCD_2H$* |

*(10-15% protonation)

I claim:

1. A process for exchanging at least one labile proton of a first compound with at least one labile deuteron of a second compound, in the absence of a catalyst, the process comprising contacting the first compound with the second compound, with the proviso that one of the compounds is a porous ion exchange resin and the other compound is a non-solid.

2. A process for substituting deuterons for labile protons in a compound, the process comprising contacting the compound in its non-solid state with a porous polymer support which contains labile deuterons, in the absence of a catalyst.

3. The process of claim 2 in which the compound is selected from the group consisting of organic acids, alcohols, and glycols.

4. The process of claim 3 in which the support is a porous polymer selected from the group consisting of crosslinked acrylic esters and polystyrene crosslinked with divinylbenzene.

5. The process of claim 4 in which the support is in the form of porous beads.

6. The process of claim 5 in which the beads are contained in a gas chromatographic unit column.

7. The process of claim 6 in which the compound is selected from the group consisting of methanol, ethanol, isopropanol, isbutanol, t-butanol, ethylene glycol, and propylene glycol.

8. The process of claim 7 in which the compound is methanol.

9. The process of claim 8 in which a carrier gas is used in the gas chromatographic unit.

10. A process for substituting protons for labile deuterons in a compound, the process comprising contacting the compound with a porous polymer support which contains labile protons, in the absence of a catalyst.

* * * * *